Jan. 2, 1934.  F. WOMPNER  1,942,349
SLIDE RULE
Filed Feb. 17, 1933
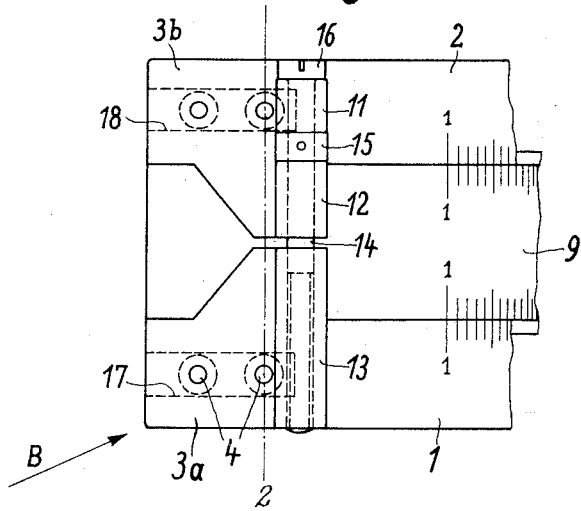
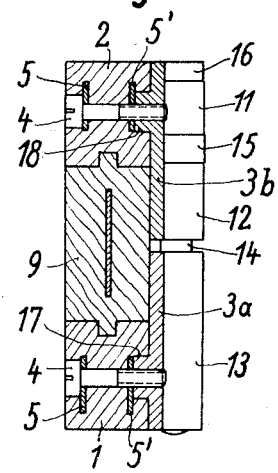
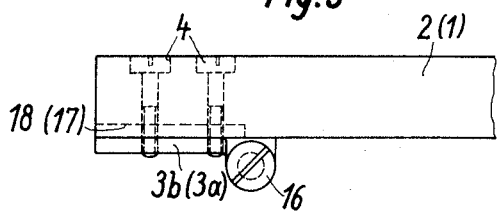
F. Wömpner
INVENTOR
By: Marks & Clark
Attys.

Patented Jan. 2, 1934

1,942,349

UNITED STATES PATENT OFFICE 1,942,349

SLIDE RULE

Fritz Wömpner, Geroldsgrun, Oberfranken, Germany

Application February 17, 1933, Serial No. 657,285, and in Germany February 29, 1932

4 Claims. (Cl. 235—70)

Slide rules with divisions on both sides are known in which the outside members are connected together on one side of the rule by a metal bridge at each end. This metal bridge has a flange serving as an abutment while drawing out the slide so that it is possible to draw out the slide steadily. The metal bridges, however, connect the two members together rigidly so that it is not possible to correct an alteration in a distance between them. In order to do this, devices for varying the distance have already been proposed which, however, are arranged within these members and thus cannot act as abutments in withdrawing the slide.

According to the invention, the device for adjusting the distance between the outer members serves at the same time as an abutment so that the double slide rule is not only very simply manipulated but also the frictional conditions can be exactly allowed for while the construction of the slide rule remains very simple. The invention consists in this that the metal bridge consists of two relatively adjustable parts connected by a screw, the bearing eyes for the screw acting as a finger hold for displacing the slide.

The relatively adjustable parts have the form of plates or tongues having bearing eyes for taking the screw. The tongue-like parts are secured to the two members of the slide rule by means of screws, the heads of which are placed in inlaid metal strips while their shanks are screwed into threaded holes of the plate-like parts forming the metal bridge. Numerous tests have shown that the bridge connection is not sufficiently secure against diagonal displacements. Thus it may happen that if the slide rule is struck obliquely on one of its edges there may be a displacement of the two members, although a very small one, so that the divisions would not lie exactly opposite one another.

In order to avoid this disadvantage a further feature of the invention consists in this that each bridge tongue is provided on its inner side with an extension running parallel to the slide rule member, which extension is accurately fitted in a suitably shaped groove in the slide rule member and prevents the bridge tongue being turned in its own plane by any diagonal forces or impacts. The elongated extensions of the bridge tongues do not allow of any displacement of the two members in the manner of a parallel rule so that the slide rule constructed in this manner has unusual stability. Instead of the rectangular extensions, two small cylindrical pins could be provided fitting accurately in corresponding borings in the slide rule members.

In the accompanying drawing a constructional example of the invention is illustrated on an enlarged scale.

Fig. 1 is a view from below of the left hand end of the slide rule,

Fig. 2 is a cross-section on the line 2—2 of Fig. 1 and

Fig. 3 is a side elevation.

The metal bridge 3a, 3b is constructed in two parts. The one part 3a is secured by means of two screws 4 (Fig. 3) to the member 1 and the other part 3b is secured by two screws 4 to the member 2. The heads of the screws 4 are placed in a known manner on flat metal strips 5 while their shanks are screwed into threaded holes in the parts 3a and 3b. The part 3b consists of a plate which forms two parts 11 and 12 while the corresponding plate of the part 3a had one eye 13 provided with an internal thread. The adjustable connection of the parts 3a and 3b is effected by means of a bolt 14 having a ring 15 riveted thereto which lies between the two eyes 11 and 12. If by means of a screw driver the bolt 14 is turned, there will be no displacement between the part 3b and the bolt 14 on account of the collar 15, but the eye 13 will be displaced longitudinally, that is, the part 3b and with it the member 2 will be displaced with respect to the member 1 so that the distance between the parts 1 and 2 can be regulated as required. If, therefore, on account of climatic or other conditions the slide 9 is too tight or too loose, this can be corrected in a very simple manner by turning the bolt 14.

The parts or bridge tongues 3a, 3b have on their inner side rectangular extensions 17 and 18 which fit accurately in corresponding grooves in the slide rule members. In each member, two flat metal strips 5 and 5' are embedded, of which one strip 5, as mentioned above, supports the heads of the securing screws 4 and the other strip 5' provides a seating for the extension 17 or 18. The bodies of the screws 4 thus pass through holes in the flat metal strips 5 and 5' and into the threaded hole of the bridge tongue 3a or 3b, reinforced by the extension 17, 18. When the screws 4 are tightened the bridge members on account of their extensions lie securely in and on the slide rule members so that a shock acting, for example, in the direction of the arrow B cannot cause any parallel displacement of the two slide rule members and thereby of their divisions since the accurately fitted longitudinal side surfaces of the extensions 17, 18 prevent rotation of the bridge members in their own plane.

In this construction of the bridge 3a, 3b, the downwardly projecting eyes form the finger hold for displacing the slide and thus ensure the advantage of easy manipulation of the slide rule.

The arrangement of only one bridge at each end of the slide rule for connecting the members 1 and 2 also makes possible the use of a cursor which can be slipped on and which is guided in grooves on the outside. Instead of the flat metal strips 5, short flat pieces could be provided on the ends of the members. If a cursor in two parts is used, it can be guided in grooves on the outside members or may be fitted with a spring rubbing on the smooth outer edges. The eyes 11, 12, 13 also allow the slide rule to rest on them so that the cursor is not loaded.

What I claim is:

1. A slide rule with divisions on both sides having a metal bridge for connecting the two outside members in which the metal bridge consists of two relatively displaceable parts, a bolt for connecting the two parts together and eyes in the two parts in which the bolt is guided and which also serve as a finger hold for displacing the slide.

2. A metal bridge for securing together the outer members of a slide rule, comprising a plate having two eyes, a second plate having one eye with an internal thread, a bolt passing through the eyes of both plates and a collar secured to the bolt and disposed between the two eyes of the first-mentioned plate.

3. A slide rule with divisions on both sides having a metal bridge for connecting the two outside members in which the metal bridge consists of two relatively displaceable parts having extensions adapted to fit accurately in corresponding recesses in the outer slide rule members so as to prevent parallel displacement of said members, a bolt for connecting the two parts together and eyes in the two parts in which the bolt is guided and which also serve as a finger hold for displacing the slide.

4. A slide rule with divisions on both sides having two outer slide rule members, a metal bridge consisting of two relatively displaceable parts and a bolt for connecting them together, for connecting the two outer members together, screws for fixing each part of the bridge to the slide rule member, an extension on each part of the bridge and two flat metal strips in each outer slide rule member, of which one supports the heads of the fixing screws and the other acts as a bearing surface for the extensions of the bridge members.

FRITZ WÖMPNER.